Patented Jan. 10, 1933

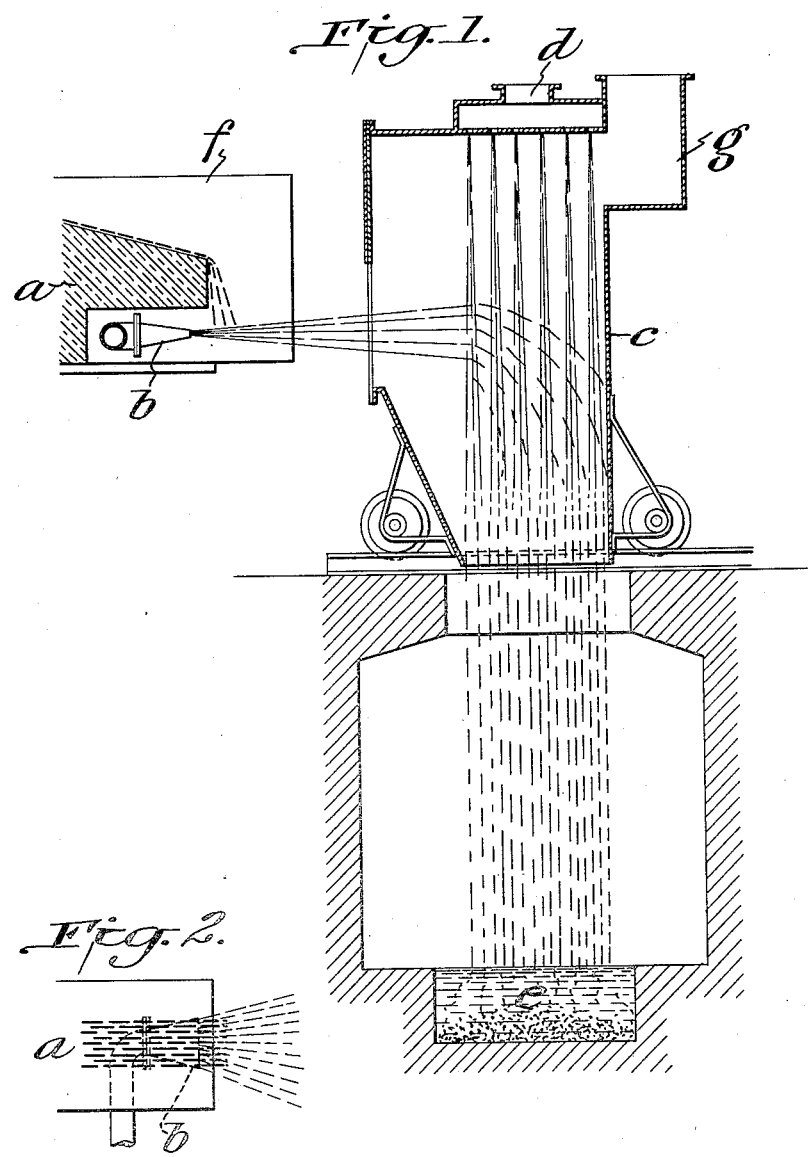

1,894,208

UNITED STATES PATENT OFFICE

CONWAY von GIRSEWALD, OF FRANKFORT-ON-THE-MAIN, HANS SIEGENS, OF HORREM NEAR COLOGNE, AND MARTIN MARSCHNER, OF FRANKFORT-ON-THE-MAIN, GERMANY, ASSIGNORS TO METALLGESELLSCHAFT AKTIENGESELLSCHAFT, OF FRANKFORT-ON-THE-MAIN, PRUSSIA, GERMANY, A CORPORATION OF GERMANY

METHOD OF PRODUCING ALUMINA

Original application filed June 15, 1928, Serial No. 285,730, which is in turn a division of application Serial No. 195,123, filed May 28, 1927, and in Germany May 8, 1926. Divided and this application filed November 15, 1929. Serial No. 407,540.

This invention is a division of our application Serial No. 285,730, filed June 15, 1928. Serial No. 285,730 is a division of application Serial No. 195,123 filed May 28, 1927, (and in Germany May 8, 1926) now Patent No. 1,704,599, dated Mar. 5, 1929.

This invention relates to a method for making disintegrated alumina from a melt of alumina. The invention also refers to a device for the execution of the new method and to the special use of the products obtained by the method.

It is a known fact that alumina obtained from a melt is an extremely hard material, which only with difficulty can be disintegrated to such a degree of fineness, as is necessary when using it as raw material for making aluminum by electrolysis.

The present invention is based on the discovery that molten alumina shrinks considerably and that very small crystals are produced when the solidification is a very quick one. It was found that by suitably conducting the quenching process of a melt of alumina, material may be obtained in which the alumina is present in crystals of a size suited for electrolysis, and that these crystals are only fritted together at their edges or corners. The material may, therefore, easily be disintegrated in an edge mill or similar simple disintegrator. Besides this important simplification of the disintegration, another surprising improvement is obtained by the invention. The fine crystalline alumina obtained by the quick quenching is more easily electrolyzed than an alumina which is not quenched or is only slowly quenched.

The granulating by quenching of alumina is known; the usual quenching methods such as the casting of fused alumina into water or spraying fused alumina with water are however not sufficient to obtain the same results as are obtained when working according to the method of the present invention. These methods further have the disadvantage that at the high temperature of the fused alumina (about 2000° C.) local superheating of the water and production of oxyhydrogen gas occur, so that explosions may take place.

According to our invention the fused alumina is first brought into a state of fine distribution and in this state subjected to a very quick quenching. Thus for example the stream of fused alumina flowing out from the furnace may be atomized and the fine drops obtained may be caught in a cold liquid, for example water, which preferably is in motion, for example, flowing. The drops are then cooled so much by the air that superheating and decomposition of the water does not take place.

The atomizing of the fused alumina may be done in different ways. One may, for example, let the stream of fused alumina drop upon suitably shaped supports effecting a fine distribution of the fused mass. Another way is to beat the stream of fused alumina by quickly rotating shovel wheels or to let it drop upon quickly rotating shovel wheels, thereby distributing it. Such atomizers may be arranged above the cooling liquid or close below the level of the cooling liquid, into which the atomized material is to drop. In the latter case the atomizer is protected by cooling and the cooling liquid at the same time thoroughly stirred and prevented from superheating. When using rotating atomizing disks one may also preferably work in such a manner that cool air or other gases or vapors are passing along the border of the atomizing disk. The atomizing of the liquid alumina may also be done by compressed air, or other compressed gases, or gas mixtures blown in a suitable manner against or into the stream of liquid alumina. In all cases it is necessary to bring the atomized liquid alumina then into contact with water or another cooling liquid, preferably in a finely distributed state, for example with a shower of water, preferably on collecting it later in a container filled with water.

The alumina disintegrated according to the invention by very quick quenching with a cooling liquid is as a rule obtained in the form of small hollow balls, in which the crystals are stuck together in such a manner that the further disintegration by mechanical means can be easily carried out. In many cases the hollow balls of alumina may even be shattered by pressing them between the fingers.

The disintegrated products have proved to be especially adapted for making aluminum and aluminum alloys by electrolysis. It is a known fact that the manufacture of alumina is troublesome, because the alumina is not quickly enough dissolved in the bath of fused cryolite. The particles of alumina drop to the bottom of the bath and increase the intermediate resistance from the cathode to the metal, thereby producing an increase of temperature which tends to the production of carbide and further increase of the intermediate resistance. The bath at the same time becomes poor in alumina, whereby the so-called anode effect is produced.

To avoid these disadvantages it has been recommended to use very finely ground crystalline alumina or to admix calcined alumina. The fine grinding is very expensive and leads to losses by dusting. The admixture of calcined alumina prevents the above described disadvantages only in part. The disadvantages do, however, not occur when alumina is used, which is disintegrated according to our invention by very quick quenching. It is less troublesome to work with an alumina prepared by the new method in the form of grains of, for example, 3 mm. size, than to work with crystalline alumina, which is not quenched and has grains of a size of 0.2 mm. and even less.

The annexed drawing shows schematically an example of a device adapted for the execution of the new method.

The stream $a$ of fused alumina guided by a suitable spout is caught by air leaving the nozzle $b$ and carried finely distributed into the cooler $c$. Here the distributed material is brought into contact with a water shower from the sprinkler $d$ and cooled by extraction of that heat which is necessary for evaporating the water. The air used for the atomization at the same time serves for carrying away the steam produced.

The material pre-cooled in this manner drops into the water cooled or water containing vessel $e$. For reasons of safety it has been found preferable to arrange the different devices described in such a manner, for example, in form of a triangle, that the stream of alumina may not drop unatomized into the water container. The stream of liquid alumina is therefore, for example, blown away from the spout. Furthermore, the water leaving the sprinkler $d$ hits the atomized alumina from above, thereby preventing the steam, which is flowing upward, from coming in contact with the hot fused mass and being decomposed. If, for example, the atomizing device $b$ should stop working for any reason, and if at the same time the container $e$ does not contain enough water, the hot liquid alumina would drop into the container $e$ and superheating of the water and explosion would occur. On the other hand sprinkling the atomized alumina from below with water has the disadvantage that the developed steam moving upward comes into contact with the hot stream of liquid alumina and tends to the production of explosive oxyhydrogen gas.

In order to prevent the contact of steam developed in the chamber $c$ with unatomized hot alumina it is of advantage to draw the vapors out by a chimney or the like. This chimney is preferably arranged in the upper part of the chamber $c$ opposite to the entrance of the atomized alumina.

It has also proved to be of advantage to arrange beside the spout, protecting walls $f$ preventing a solidification of the liquid alumina before it is caught and atomized by the air stream coming from $b$.

The cooling chamber $c$ may be made movable in order to prevent a blocking up of the room in front of the electric furnace or other source of liquid alumina.

We claim:—

1. A process of making disintegrated alumina for use in electrolysis which comprises atomizing liquid alumina by means of a stream of air, quickly quenching the atomized product by means of water, and conducting the generated steam away from the liquid alumina.

2. A process of making disintegrated alumina for use in electrolysis which comprises atomizing liquid alumina by means of a stream of air, quickly quenching the atomized product by means of a water spray, and conducting the generated steam away from the liquid alumina by means of the stream of air.

3. A process of making disintegrated alumina for use in electrolysis which comprises atomizing liquid alumina, quickly quenching the atomized product by means of finely divided water, collecting the quenched product in flowing water, and conducting the generated steam off through the flowing water and thus preventing it from coming in contact with the liquid alumina prior to atomization.

4. A process of making disintegrated alumina for use in electrolysis which comprises atomizing liquid alumina by a stream of air, quickly quenching the atomized product by a spray of water, conducting the generated steam through the water spray out of the quenching chamber, and thus preventing it from coming in contact with the liquid alumina, and then collecting the quenched product in water.

5. A process of making disintegrated alumina for use in electrolysis which comprises atomizing liquid alumina by a horizontal stream of gas, quickly quenching the atomized product by a vertical spray of water, and conducting the generated steam through the vertical spray of water out of the quenching chamber, thus preventing it from coming in contact with the liquid alumina.

6. A process of making disintegrated alumina for use in electrolysis which comprises atomizing liquid alumina by a horizontal stream of gas, quickly quenching the atomized product by a vertical spray of water, conducting the generated steam away from the liquid alumina through the vertical spray of water out of the quenching chamber, and collecting the quenched product in water.

7. A process of making disintegrated alumina for use in electrolysis which comprises atomizing liquid alumina by a horizontal stream of air, quickly quenching the atomized product by a downward spray of water, the generated steam being conducted off through the downward water spray out of the quenching chamber, and thus being prevented from coming in contact with the liquid alumina.

8. A process of making disintegrated alumina for use in electrolysis which comprises atomizing liquid alumina by a horizontal steam of air, quickly quenching the atomized product by a downward spray of water, allowing the generated steam to pass off through the water spray out of the quenching chamber, thus preventing it from coming in contact with the liquid alumina, and then collecting the quenched product in water.

9. A process of making disintegrated alumina for use in electrolysis which comprises atomizing liquid alumina, quickly quenching the atomized product by means of a spray of water, collecting the quenched product in water, and maintaining the steam formed as a result of the quenching out of contact with the liquid alumina prior to the atomization.

In testimony whereof, we affix our signatures.

CONWAY von GIRSEWALD.
HANS SIEGENS.
MARTIN MARSCHNER.